US005797460A

United States Patent [19]

Parker et al.

[11] Patent Number: 5,797,460
[45] Date of Patent: Aug. 25, 1998

[54] STRAIGHT BAR TILLAGE IMPLEMENT

[75] Inventors: Paul David Parker, Ankeny; Jason Daniel Wattonville, Maxwell, both of Iowa

[73] Assignee: Deere & Company, Moline, Ill.

[21] Appl. No.: 734,936

[22] Filed: Oct. 22, 1996

[51] Int. Cl.$^6$ ..................................................... A01B 13/08
[52] U.S. Cl. ........................... 172/151; 172/166; 172/177; 172/184; 172/196; 172/198; 172/540; 172/603; 172/624.5; 172/627; 172/661
[58] Field of Search ........................ 172/139, 140, 172/144, 145, 146, 149, 151, 166, 172, 173, 174, 175, 177, 178, 179, 180, 181, 184, 187, 196, 198, 484, 487, 540, 554, 603, 605, 615, 624.5, 627, 633, 634, 640, 661, 700

[56] References Cited

U.S. PATENT DOCUMENTS

| | | |
|---|---|---|
| 3,708,016 | 1/1973 | Shader. |
| 4,126,190 | 11/1978 | Wylie ........................... 172/624.5 |
| 4,213,408 | 7/1980 | West et al.. |
| 4,336,844 | 6/1982 | Helbig et al. ................... 172/700 X |
| 4,377,979 | 3/1983 | Peterson et al. ................ 172/151 X |
| 4,600,060 | 7/1986 | Winter et al.. |
| 4,623,024 | 11/1986 | Schlenker. |
| 4,660,653 | 4/1987 | Mayeda et al. ................. 172/624.5 X |
| 4,681,335 | 7/1987 | Ledermann et al.. |
| 4,696,349 | 9/1987 | Harwood et al.. |
| 4,699,220 | 10/1987 | Strohm ........................... 172/700 X |
| 4,834,189 | 5/1989 | Peterson et al. ................ 172/624.5 X |
| 4,865,132 | 9/1989 | Moore, Jr. ...................... 172/196 |
| 4,905,770 | 3/1990 | Hanig ............................. 172/624.5 X |
| 5,020,604 | 6/1991 | Peck ............................... 172/177 |
| 5,437,337 | 8/1995 | Dietrich, Sr. ................... 172/700 X |
| 5,474,135 | 12/1995 | Schlagel ......................... 172/151 |
| 5,544,709 | 8/1996 | Lowe et al. ..................... 172/624.5 X |
| 5,632,343 | 5/1997 | Gengler ........................... 172/146 X |
| 5,640,914 | 6/1997 | Rawson ........................... 172/624.5 X |
| 5,669,451 | 9/1997 | Noonan et al. ................. 172/624.5 |

OTHER PUBLICATIONS

Kelly Manufacturing Co., brochure entitled "Subsoil No-Till Planter", 1 page, date unknown, published in the U.S.A.

DMI, brochure entitled "DMI Ecolo-Til™ 500 3, 5 & 7 Shank Conservation Yield-Till$^R$ Tools", 3 pages, date unknown, published in the U.S.A.

Primary Examiner—Terry Lee Melius
Assistant Examiner—Christopher J. Novosad

[57] ABSTRACT

A tillage implement includes straight bar ripper structure with a main forward toolbar supporting subsoiler shanks from special brackets which can also support coulters ahead of the shanks independently of additional toolbar structure. An optional rear or secondary toolbar is attached by four-bar linkages to the main toolbar. The four-bar linkages allow the operator to adjust the height of the secondary toolbar relative to the main toolbar to accommodate changes in the operating depth of the rippers. The linkages may also be released to allow the secondary toolbar to float relative to the main toolbar. The secondary toolbar accommodates different attachments behind the rippers, such as disk bedders, lister bedders and strip till rigs which can operate at optimum attack angles and penetration regardless of the operating depth of the ripper. The strip till rig includes coulters and a rolling basket supported from the secondary frame by a four bar linkage so the attack angle and the relative operating height of the coulters and rolling basket remain constant as the rig floats throughout the entire vertical range of the rig. The combination of the adjustable secondary toolbar and the four-bar linkage on the rig provides versatility for different soil conditions and different tool and rig operating depths. Transversely adjustable brackets on the main and secondary toolbars help accommodate different tool spacings.

17 Claims, 4 Drawing Sheets

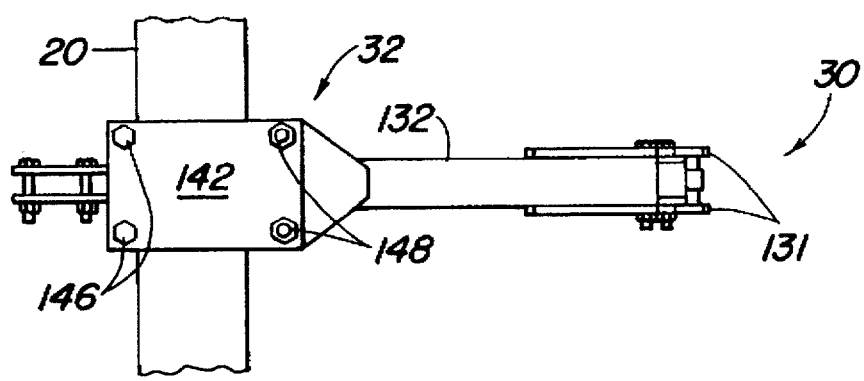
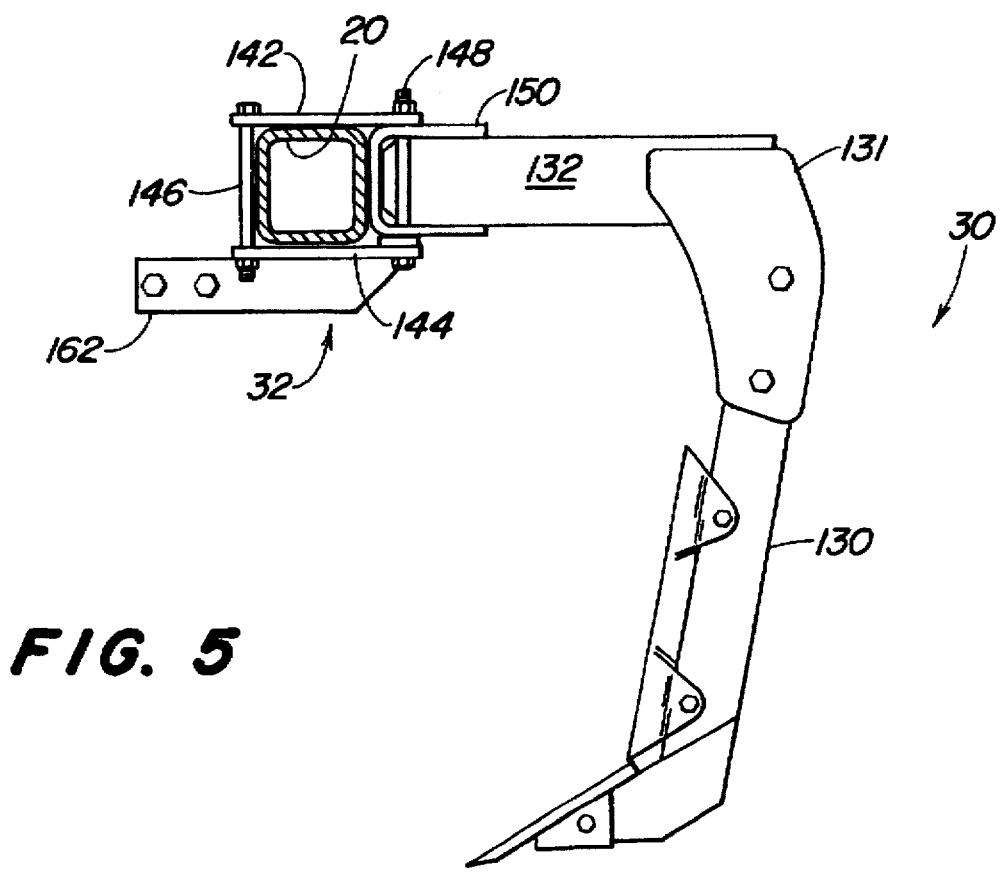

STRAIGHT BAR TILLAGE IMPLEMENT

BACKGROUND OF THE INVENTION

1) Field of the Invention

The present invention relates generally to agricultural earthworking implements, and, more specifically, to a strip tillage implement and to a ripper implement which is convertible for changing between conventional tillage and strip tillage.

2) Related Art

Many different forms of conservation tillage practices are emerging which involve leaving plant residue on the surface of the ground to preserve top soil. In one of these forms, referred to as strip tillage, a strip of soil where crop will be planted is tilled and crop residue or a cover crop is left between the tilled strips. Typically, strip till machines utilize a combination of fluted coulters to help till the soil and a rolling basket to break clods. Strip tillage is often combined with a toolbar mounted ripper or subsoiler to break through compacted layers of soil, and the coulters are angled to throw soil inwardly over the slot formed by the ripper. The coulters in some machines are mounted on a simple swing arm which floats vertically.

An undesirable affect of the swing arm arrangement include the change in the attack angle of the coulters and the changes in height between the coulters and the rolling basket as the rig floats vertically. Existing machines also rely on one or more set screws to set the height and angle of operation, and such adjustments are often imprecise and non-uniform across the width of the machine. Maintaining uniform bed height has therefor been a problem with many strip tillage machines.

Another problem delaying the implementation of strip tillage has been the expense of providing a separate implement. Farmers have been hesitant to invest in a complete new machine, particularly if they are uncertain of the benefits of the practice in their particular crop and soil conditions.

If a toolbar-mounted ripper is utilized, a separate frame bar is usually provided to support trash-sizing coulters directly ahead of the rippers. The separate bar, necessitated by lack of space under the toolbar, adds to the cost and complexity of the implement. The extra bar also makes transverse adjustments to accommodate different row spacings more inconvenient and may require increased rearward offset of the implement toolbar from the hitch. There can be a wide variation in the selected operating depth of the rippers, and change in vertical position of the toolbar to achieve different depths can adversely affect the angle of attack and relative depth of operation of the various tools on the trailing implement rig. In different ground conditions, different trailing implements may be necessary, but converting the implement to adapt to the conditions can be difficult. Available mounting arrangements often are insufficiently versatile to provide optimum tool location and operation.

BRIEF SUMMARY OF THE INVENTION

It is therefore an object of the present invention to provide an improved tillage implement that overcomes most or all of the above-mentioned problems.

It is another object to provide an improved implement having strip till rigs. It is yet another object to provide such an implement with improved attack angle and height control capabilities. It is another object to provide such an implement which provides a more uniform bed height across the width of the machine.

It is another object of the present invention to provide an improved implement with more versatility than many previously available tillage implements and which reduces operator costs by eliminating need for separate implements for different tillage operations. It is a further object to provide such an implement that includes a frame structure accommodating different combinations of tillage tools, and bracket and linkage structure facilitating a wide variety of row spacings.

It is a further object to provide an improved implement that is particularly useful as a straight bar ripper in combination with other tillage tools including strip till rigs. It is another object to provide such an implement having improved bracket structure for mounting subsoiler shanks and for attaching coulters without need for an additional mounting tube for the coulters.

It is a further object of the invention to provide an implement including a forward toolbar for supporting tillage tools such as rippers and an adjustable or floating secondary frame structure for attaching other tools behind the rippers. It is another object to provide such an implement having improved depth control and float capability and wherein the optimum attack angle of the tools on the secondary frame can be maintained, even when the forward toolbar is adjusted vertically to vary the depth of operation of the rippers.

In accordance with the above objects, a tillage implement is provided which includes straight bar ripper structure with a main forward toolbar supporting subsoiler shanks. An optional rear or secondary toolbar attached by four-bar linkages to the main toolbar. The four-bar linkages allow the operator to adjust the height of the secondary toolbar relative to the main toolbar dependent on the operating depth of the rippers. Alternatively, the linkages may be released to allow the secondary toolbar to float relative to the main toolbar, for example, when a disk bedder and gauge wheel structure are attached to the secondary toolbar. The adjustability of the secondary toolbar accommodates different attachments behind the rippers, such as disk bedders, lister bedders and strip till rigs which can operate at optimum attack angles and depths of penetration regardless of the operating depth of the ripper. If a farmer has a conventional machine setup such as subsoiler shanks on the main toolbar and disk bedders or lister bedders mounted on the secondary toolbar, he only has to change the rear attachments to convert to strip tillage. The conversion requires only the purchase of strip till rigs, not an entire new machine, thereby lowering the cost and risk of trying the new conservation tillage system. The various toolbar brackets, linkages and tools are easily adjusted transversely on the toolbars to provide for virtually any desired row spacings.

The strip till rig includes fluted coulters and a rolling basket or clod eliminating device which are adjustable vertically relative to each other. The rig is supported from the secondary frame by four-bar linkage so the attack angle and the relative operating height of the coulters and rolling basket remain constant as the rig floats throughout the entire vertical range of the rig. The structure therefore assures a more uniform bed than other types of strip till rigs which allow the height between the coulters and the rolling basket to change as the rigs pivot. The combination of the adjustable secondary toolbar and the four-bar linkage on the rig provides a versatile implement for adaptable to highly varying soil conditions and different tool and rig operating depths and row spacings. The rig four-bar linkage also includes easily adjustable and repeatable down force settings for uniform and predictable rig down force across the width of the implement.

BRIEF DESCRIPTION OF THE DRAWINGS

FIG. 5 is a side view of the ripper standard assembly.

FIG. 6 is a top view of the ripper standard assembly of FIG. 5.

DETAILED DESCRIPTION OF THE DRAWINGS

Figure 1:
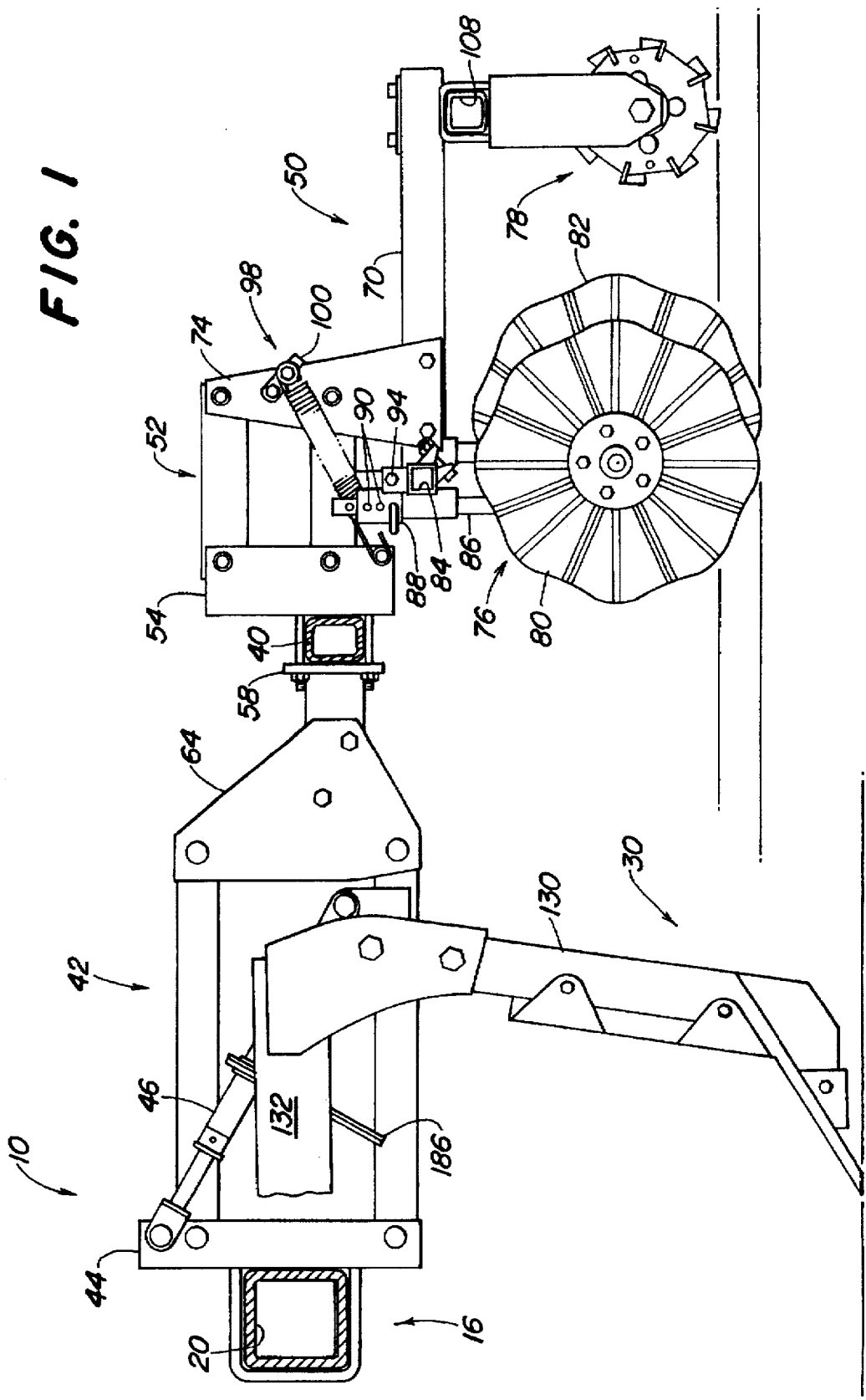
FIG. 1 is a side view of an implement having a toolbar with ripper standards and trailing strip till attachments connected to a secondary toolbar, with portions of a ripper standard broken away to more clearly show the connection between the main and secondary toolbars.
Figure 2:
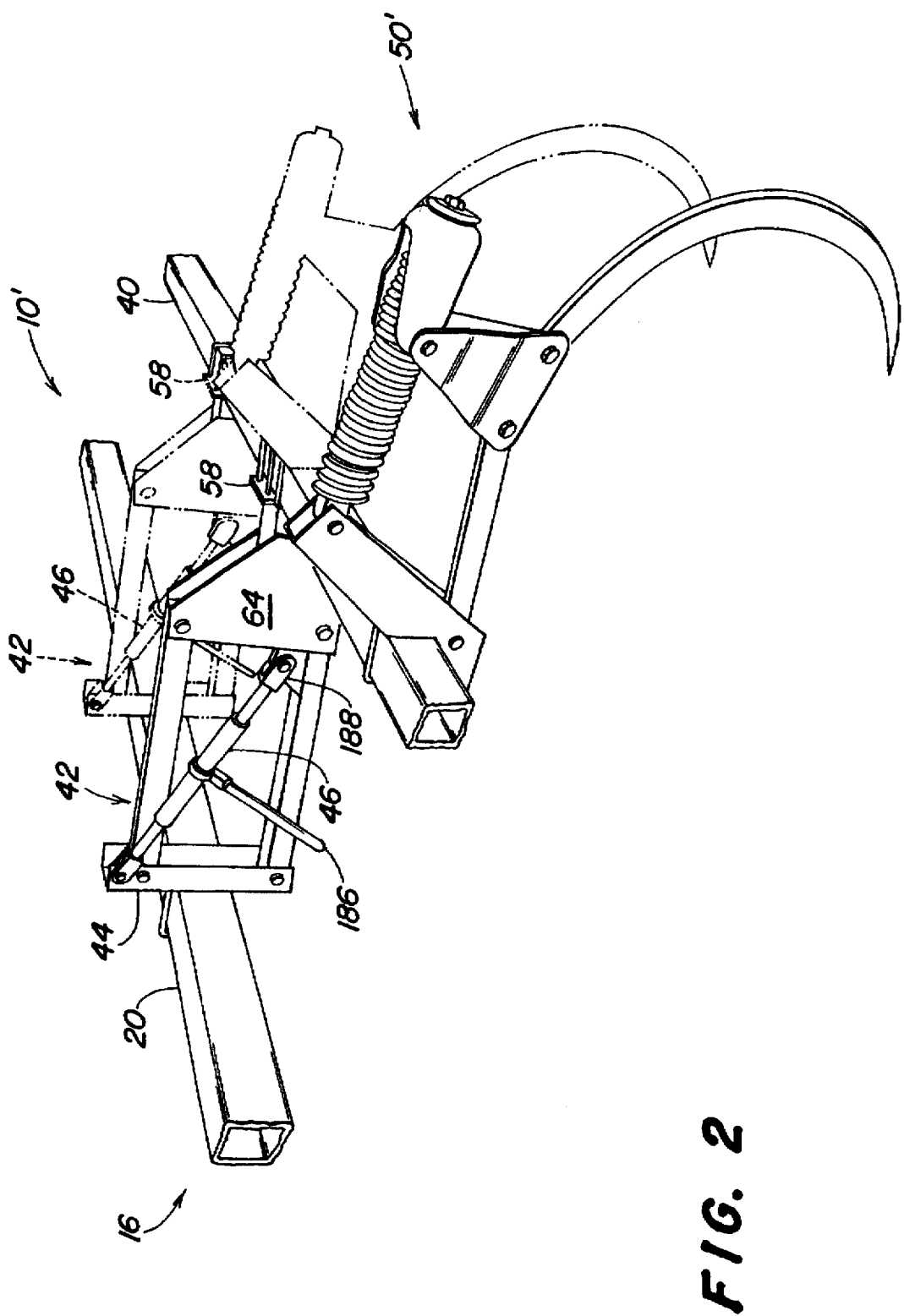
FIG. 2 is a rear perspective view of a rear portion of the implement of FIG. 1 but with the strip till attachments replaced by other tillage tools.
Figure 3:
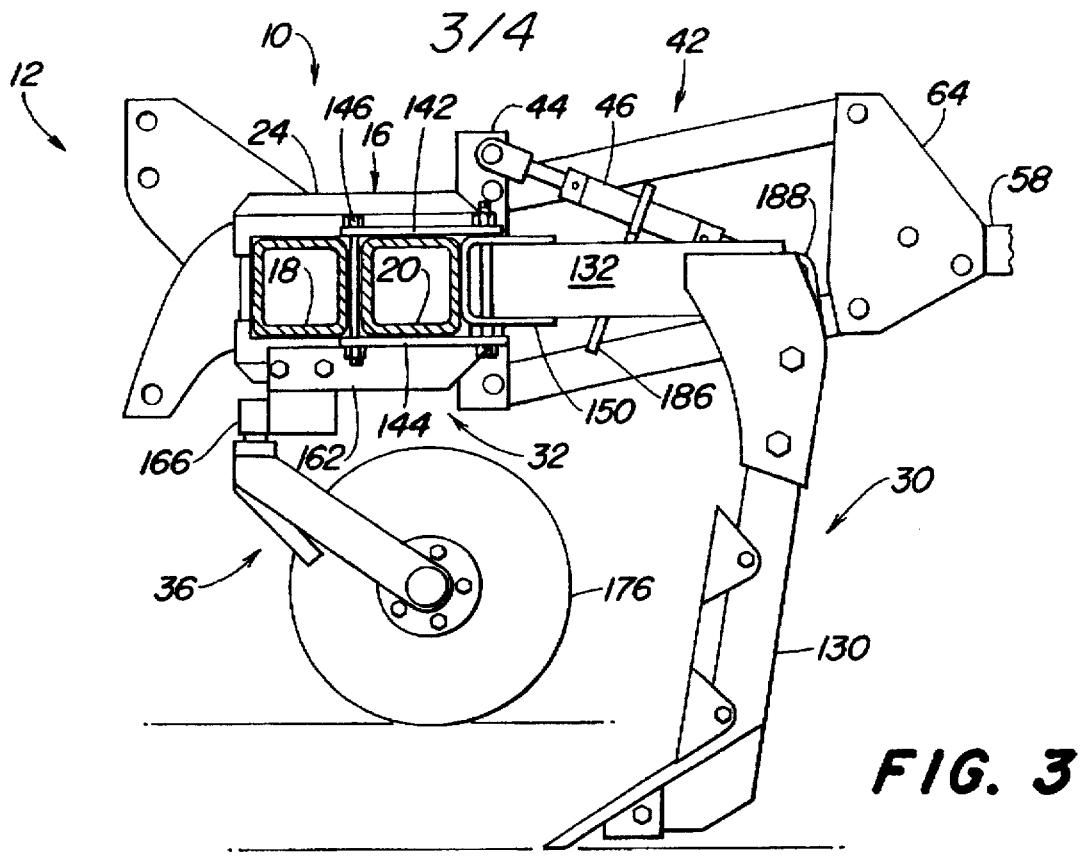
FIG. 3 is a side view of a portion of the implement of FIG. 1 with the secondary toolbar adjusted upwardly for deep ripper operation and further including a trash-sizing coulter mounted below the toolbar independently of a separate coulter mounting tube.
Figure 4:
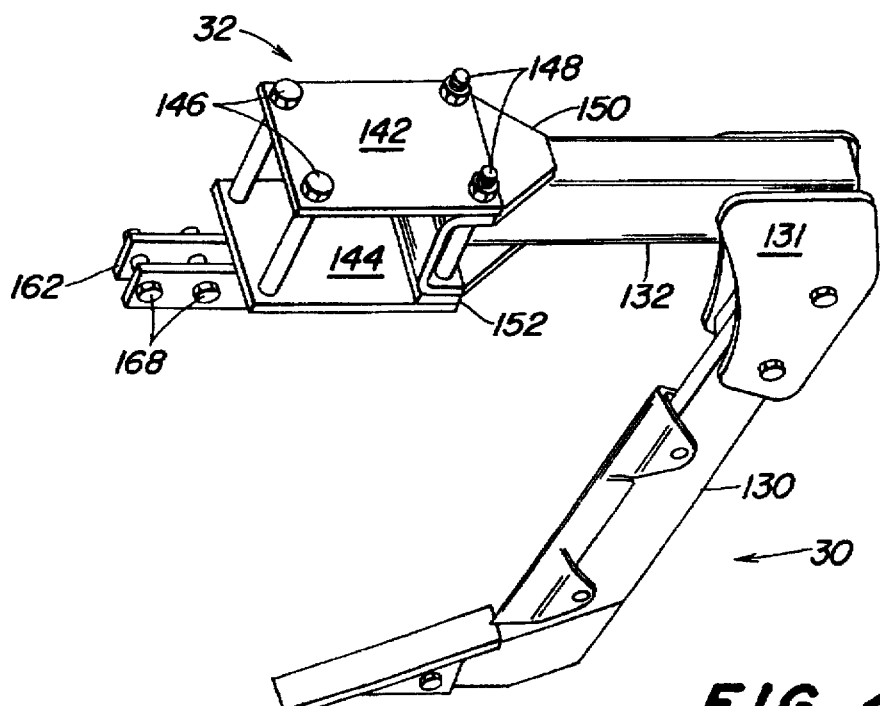
FIG. 4 is a top perspective view of the ripper standard assembly showing details of the ripper and coulter mounting bracket structure.

Referring now to FIGS. 1–3, therein is shown a tillage implement 10 including hitch structure 12 (FIG. 3) adapted for connection to a conventional three-point hitch (not shown) on a tractor. The hitch structure 12 supports frame or primary toolbar structure 16 at vertically adjustable positions for forward movement over the ground. The primary toolbar structure 16 includes a transversely extending hitch tube 18 connected to the hitch structure 12 and a longer tool-supporting main frame tube 20 connected in parallel and rearwardly offset fashion relative to the hitch tube 18 by brackets 24 spaced outwardly from the hitch structure 12.

A plurality of deep tillage tools 30 are connected to the main frame tube 20 at transversely spaced locations by bracket structure 32. Trash-sizing coulter structure 36 (FIG. 3) is selectively attachable directly to the bracket structure 32 independently of any separate coulter support tube or the like for operation under the primary toolbar structure 16. The bracket structure 32 is adjustable transversely on the frame tube 20 for varying the spacings of the tools 30.

Secondary or rear toolbar structure indicated generally at 40 in FIGS. 1 and 2 is adjustably supported from the primary toolbar structure 16 by parallel four-bar linkage structures 42 having forward upright brackets 44 mounted on the tube 20 between the bracket structures 32. An adjustable length member 46 on each of the structures 42 provides height adjustment of the secondary toolbar structure 40 relative to the main frame tube 20. Alternatively, the member 46 may be removed to allow the secondary toolbar structure 40 to float relative to the tube 20. The parallel bar linkage structures 42 maintain the toolbar structure 40 generally parallel to the forward toolbar 20 and at a preselected angular position relative to a transverse horizontal tube axis as the structure 40 is adjusted vertically or as the structure 40 floats vertically relative to the tube 20.

A plurality of rear mounted tillage tool supports or rigs 50 are connected to the secondary toolbar structure 40 by rear parallel four bar linkage structures 52 having forward upright brackets 54 secured at transversely spaced locations on the secondary toolbar structure 40 by U-bolts (not shown). The secondary toolbar structure 40 is connected by brackets 58 to aft plates 64 of the forward four bar linkages 42. As shown in FIG. 1, the rigs 50 are strip till rigs each having a main fore-and-aft extending tube 70 sandwiched between the lower ends of upright plates 74 of the corresponding four-bar linkage 52. A coulter assembly 76 is adjustably secured to the forward end of the tube 70 below the four bar linkage structure 52. A rolling basket or similar tool 78 is rotatably supported from the aft end of the tube 70 and is offset behind the coulter assembly 76 for breaking clods, incorporating chemicals and/or firming the soil in the bed.

The coulter assembly 76 includes transversely spaced fluted coulters 80 and 82 (FIG. 1) supported from a transverse tube 84 secured to the forward end of the tube 70. Upright shanks 86 are supported in brackets 88 which are apertured at 90 for vertical adjustment of the coulters relative to the tool 78. As can be appreciated from FIG. 1, once the shanks are adjusted, the four-bar linkage structures maintain the vertical relationship between the coulter assembly 76 and the basket 78 constant as the rig 50 floats. A screw arrangement 94 on each of the brackets 88 sets the shank 86 at the desired angular relationship relative to an upright axis for the desired attack angle. To change the attack angle of a coulter, the operator simply turns the screw 94. The coulter adjusting structure preferably is of the type shown and described in U.S. Pat. No. 4,738,316 which is of common ownership with the present application. An indicator operatively associated with the screw arrangement provides an indication of the attack angle. The four-bar linkage structure 52 retains the coulter assembly 76 in substantially the same attitude as the rig floats vertically so that the attack angle remains substantially constant. A spring assembly 98 with over-center toggle 100 provides adjustable rig down force settings. Two selectively attachable and removable spring assemblies 98, one on each side of the linkage structure 52 and each having two positions for the toggle 100, provide six distinct and easily changeable and repeatable down force settings. Preferably the coulters 80 and 82 operate on opposite sides of a slot formed by the leading tool 30 and throw soil over the slot. The coulters are set at an angle to the vertical and angle outwardly in the upward direction to throw more soil over the slot and provide a small bed. The basket 78, which preferably has a width approximately equal to the spacing between the coulters 80 and 82, is supported from a transversely extending tube 108 secured to the aft end of the tube 70.

The tillage tool 30 is shown as a ripper having a subsoiler shank 130 connected by a bracket and break-away bolt assembly 131 to the aft end of a horizontal leg 132 of rectangular cross section. The leg 132 has a forward end fixed to the bracket structure 32 and extends rearwardly from, and at a right angle to, the aft face of the main frame tube 20. The rearward offset provides ample space for the coulter assembly 36 directly under the frame tube 20. The plane of the bottom wall of the horizontal leg 132 is located above the plane of the bottom wall of the tube 20 for good trash clearance.

As shown in FIGS. 3–6, the bracket structure 32 includes upper and lower plates 142 and 144 adapted to embrace the top and bottom walls of the main frame tube 20. Forwardly and rearwardly located bolts 146 and 148 extend through apertures in the plates and are tightened to clamp the bracket structure 32 at any desired location along the tube 20. A rearwardly opening channel-shaped support 150 is welded to the forward end of the leg 132 and is secured between the bracket plates 142 and 144 by the rearward bolts 148. A spacer 152 is sandwiched between the lower forward portion of the support 150 and the aft end of the plate 144. A coulter bracket 162 connected to the bottom of the plate 144 has a coulter receiving end projecting forwardly and below the front face of the tube 20. A coulter support 166 is connected to the bracket 162 by bolts 168. A trash-sizing coulter 176 is rotatably mounted on the support 166 below the tube 20 and directly in line with the shank 130. The support 166 provides limiting castering action for the coulter 176. The aft edge of the coulter 176 is located below the forward end of the leg 132 (FIG. 3) and directly above the leading edge of the tool. The forward edge of the coulter 176 is located slightly forwardly of the leading face of the tube 20. As the bracket structures 32 are adjusted transversely on the tube 20 for the desired row spacings, the coulter 176 is automatically positioned in the proper location without need for additional adjustments. The offset provided between the tubes 18 and 20 by the brackets 24 facilitates transverse movement of the bolts 146 with the bracket structures 32 so the bolts do not have to be removed for most tool spacing adjustments. The transverse adjustability of the brackets 24 and 32 and linkages 42 and 52 easily accommodates virtually any desired tool spacings.

At least two four bar linkage structures 42 are transversely spaced on the main tube 20 for side to side stability of the rear toolbar structure 40. Additional structures 42 may be added depending on the loading presented by the rear mounted tools. For example, when tillage tools such as chisel plow standards 50' (FIG. 2) are mounted on the secondary toolbar structure 40, three or more of the structures 42 may be provided. The linkage structures 42 are adjusted to the desired height by varying the length of the corresponding members 46, which preferably are ratchet members having a ratcheting handle 186. For a strip till machine, the members 46 may be adjusted so the average position of the rear four bar linkages 52 is substantially horizontal as shown in FIG. 1 during normal tillage operations. If the depth of the tools 30 is increased (i.e., the main frame tube 20 is lowered, the secondary toolbar structure 40 can be raised relative to the toolbar 20 by simply decreasing the length of the members 46 to raise the aft plates 64 (FIG. 3). The ends of each of the members 46 are connected by quick lock pins to the forward bracket 44 and to an upwardly projecting stop member 188 located near the aft pivot on the lower link of the linkage structure 52. The member 188 functions as a down stop limit in the float mode. As the linkage structure 42 pivots downwardly to a preselected lowermost position, the member 188 contacts the aft plate structure 64 to prevent further downward rocking, for example, when the implement 10 is lifted to the transport position.

To provide rear toolbar float when, for example, disk bedder and gauge wheel structures are mounted on the rear toolbar structure 40, the members 46 are ratcheted to a lengthened position so the stop members 188 contact the plate structure 64 and relieve pressure on the quick lock pins. The pins and the member 46 are then removed so the rear toolbar structure 40 floats and the gauge wheel structure maintains a preselected distance between the toolbar and the ground.

Having described the preferred embodiment, it will become apparent that various modifications can be made without departing from the scope of the invention as defined in the accompanying claims.

We claim:

1. A tillage implement having a transversely extending main frame tube adapted for forward movement over the ground, a strip tillage device connected to the main frame tube, the strip tillage device including:

a fore-and-aft extending four-bar linkage having a forward end connected to the main frame tube, and an aft end movable vertically relative to the main frame tube;

a tool support fixed to the aft end and movable vertically with the aft end, the four-bar linkage maintaining a substantially constant tool support attitude relative to the ground;

a pair of transversely spaced coulters supported from the tool support for operation at a preselected depth of penetration of the ground;

a rotating clod-eliminating tool connected to the tool support rearwardly of the pair of coulters, whereby the four-bar linkage and tool support maintain the coulters at a substantially constant angle of attack relative to the ground and maintain a substantially constant vertical distance between the coulters and the clod-eliminating tool; and wherein the strip tillage device includes a secondary toolbar, a toolbar linkage connecting the secondary toolbar to the main frame tube and selectively facilitating vertical movement of the secondary toolbar relative to the main frame tube, and wherein the forward end of the four-bar linkage is connected to the toolbar linkage.

2. The tillage implement as set forth in claim 1 including an adjustment mechanism for varying the vertical distance between the coulters and the clod-eliminating tool.

3. The tillage implement as set forth in claim 2 wherein the adjustment mechanism includes a vertically adjustable shank portion connected between the coulters and the tool support for moving the coulters vertically.

4. The tillage implement as set forth in claim 3 further including an attack angle adjustment connected to the coulters, whereby the attack angle of the coulters is are both adjustable.

5. The tillage implement as set forth in claim 1 including an adjustable down pressure tension spring structure connected to the four-bar linkage for varying down pressure on the coulters and the tool.

6. The tillage implement as set forth in claim 1 wherein the secondary toolbar is vertically adjustable relative to the main frame tube, the toolbar linkage selectively providing a float operation of the secondary toolbar relative to the main frame tube and a fixed, vertically adjustable relationship between the secondary toolbar and the main frame tube.

7. The tillage implement as set forth in claim 1 wherein the toolbar linkage comprises four-bar linkage structure.

8. The tillage implement as set forth in claim 1 further including a tillage tool connected to the main frame tube, and wherein the main frame tube is vertically adjustable to vary depth of penetration of the tillage tool, and the toolbar linkage is movable vertically to maintain a preselected relationship between the tool support and the ground while accommodating the vertical adjustment of the main frame tube.

9. The tillage implement as set forth in claim 8 including bracket structure connecting the tillage tool to the main frame tube substantially rearwardly of the main frame tube, and a debris-cutting coulter supported from the bracket structure below the main frame tube independently of additional transversely extending tube structure offset from the transverse main frame tube.

10. A tillage implement having a main toolbar connected to hitch structure and adapted for forward movement over the ground, the main toolbar including forward and rearward faces and top and bottom walls connecting the faces, a tillage tool assembly connected to the main toolbar, at least two four-bar linkage structures having forward ends including forward bracket structure connected to the main toolbar adjacent the rearward face and transversely adjustable along the main toolbar independently of the tillage tool assembly, the forward bracket structure supporting the linkage structures at locations offset transversely from the tillage tool assembly, the four-bar linkage structures including aft ends, a secondary toolbar connected to the aft ends of the linkage structures, and height adjusting structure connected to the four-bar linkage structures for varying the relative vertical location of the secondary toolbar relative to the main toolbar.

11. The tillage implement as set forth in claim 10 further comprising tillage standards connected to the secondary toolbar and supporting earthworking tools with soil penetrating portions located aft of the secondary toolbar.

12. The tillage implement as set forth in claim 10 further comprising a rear four-bar linkage connected to the secondary toolbar, and tillage tool structure connected to the rear four-bar linkage and rockable vertically therewith relative to the secondary toolbar, the rear four-bar linkage maintaining a substantially constant angle of the tillage structure relative to the ground as the tillage tool structure rocks vertically with the rear four-bar linkage.

13. The tillage implement as set forth in claim 10 wherein the at least two four-bar linkage structures include aft plates spaced on opposite sides of the aft ends of the at least two linkage structures and brackets connected between the aft plates and the aft ends and extending rearwardly from the plates to connections with the secondary toolbar.

14. The tillage implement as set forth in claim 10 wherein the height adjusting structure includes adjustable length members selectively attachable to and removable from the four-bar linkage structures for adjusting the secondary toolbar relative to the main toolbar when attached, the secondary toolbar floating relative to the main toolbar when the adjustable length members are removed, and wherein the four-bar linkage structures include a downstop for limiting downward movement of the secondary toolbar relative to the main toolbar when the adjustable length members are removed.

15. A tillage implement having a main toolbar connected to hitch structure and adapted for forward movement over the ground, the main toolbar including forward and rearward faces and top and bottom walls connecting the faces, a tillage tool assembly connected to the main toolbar, at least two four-bar linkage structures having forward ends connected to the main toolbar and transversely adjustable along the main toolbar, the four-bar linkage structures including aft ends, a secondary toolbar connected to the aft ends of the linkages, height adjusting structure connected to the four-bar linkages for varying the relative vertical location of the secondary toolbar relative to the main toolbar, and further comprising a rear four-bar linkage connected to the secondary toolbar, and tillage tool structure connected to the rear four-bar linkage and rockable vertically therewith relative to the secondary toolbar, the rear four-bar linkage maintaining a substantially constant angle of the tillage structure relative to the ground as the tillage tool structure rocks vertically with the rear four-bar linkage.

16. The tillage implement as set forth in claim 15, wherein the tillage tool structure comprises a forward coulter and a rear clod eliminating device, and height adjusting structure for selectively adjusting the vertical location of the coulter with respect to the clod eliminating device, wherein the rear four-bar linkage maintains the selected vertical location as the tillage tool structure rocks vertically.

17. The tillage implement as set forth in claim 15 wherein the tillage tool assembly includes a transversely adjustable bracket connected to the main toolbar, a horizontal leg connected to the adjustable bracket and extending rearwardly from the rearward face of the main toolbar above the bottom wall of the main toolbar, a coulter support connected to the adjustable bracket and transversely adjustable with the bracket, and a trash-sizing coulter supported from the coulter support for rotation below the main toolbar and below the horizontal leg.

* * * * *